US012566496B1

(12) United States Patent
Rai Kurlethimar et al.

(10) Patent No.: US 12,566,496 B1
(45) Date of Patent: Mar. 3, 2026

(54) REFOVEATION OF RENDERED CONTENT BASED ON GAZE

(71) Applicant: Apple Inc., Cupertino, CA (US)

(72) Inventors: Yashas Rai Kurlethimar, San Jose, CA (US); Nathaniel C. Begeman, Saratoga, CA (US); Seyedkoosha Mirhosseini, Santa Clara, CA (US); Yanli Zhang, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 115 days.

(21) Appl. No.: 18/616,020

(22) Filed: Mar. 25, 2024

Related U.S. Application Data

(60) Provisional application No. 63/455,595, filed on Mar. 30, 2023.

(51) Int. Cl.
*G06F 3/01* (2006.01)
*G02B 27/00* (2006.01)
*G02B 27/01* (2006.01)
*G06T 3/40* (2006.01)

(52) U.S. Cl.
CPC ......... *G06F 3/013* (2013.01); *G02B 27/0093* (2013.01); *G02B 27/0172* (2013.01); *G06T 3/40* (2013.01)

(58) Field of Classification Search
None
See application file for complete search history.

(56) References Cited

U.S. PATENT DOCUMENTS

| | | | | |
|---|---|---|---|---|
| 10,712,817 B1* | 7/2020 | Rönngren | .......... | G02B 27/0093 |
| 2012/0236184 A1* | 9/2012 | Jia | ............ | H04N 7/18 |
| | | | | 348/241 |
| 2019/0287495 A1* | 9/2019 | Mathur | .................. | G06F 3/147 |
| 2021/0029340 A1* | 1/2021 | Wu | ....................... | H04N 13/178 |
| 2021/0281638 A1* | 9/2021 | Vrcelj | ....................... | G06T 1/20 |
| 2023/0113746 A1* | 4/2023 | Goswami | ................ | G06F 3/013 |
| | | | | 345/593 |

* cited by examiner

*Primary Examiner* — Jwalant Amin
(74) *Attorney, Agent, or Firm* — Fernando & Partners, LLP

(57) ABSTRACT

A method includes obtaining a first frame that is associated with a first foveation parameter. The first frame is rendered based on first eye tracking data obtained at a first time. The method includes capturing, via the eye tracker, second eye tracking data at a second time that occurs after the first time. The method includes refoveating the first frame based on the second eye tracking data in order to generate a second frame with a second foveation parameter that is different from the first foveation parameter. The method includes performing a post-rendering operation on the second frame.

20 Claims, 5 Drawing Sheets

300

Obtain a first frame rendered based on first eye tracking data obtained at a first time, the first frame has a first foveation parameter Receive first frame from a renderer 310a — 310

Capture second eye tracking data at a second time occurring after the first time Eye tracking data indicate different gaze positions 320a — 320

Capture 2nd eye tracking data during/after rendering of 1st frame 320b

Refoveate first frame based on second eye tracking data to generate a second frame with a second foveation parameter Foveation parameters are foveation plateau sizes 330a Refoveate based on content type and/or battery level 330b — 330

Foveation parameters indicate visual degrees 330c

Refoveation includes resampling and/or removing artifacts 330d

Perform post-rendering operation on the second frame

Composite, reproject, safety adjustment, brightness adjustment, temporal smoothing and/or color correction 340a — 340

300

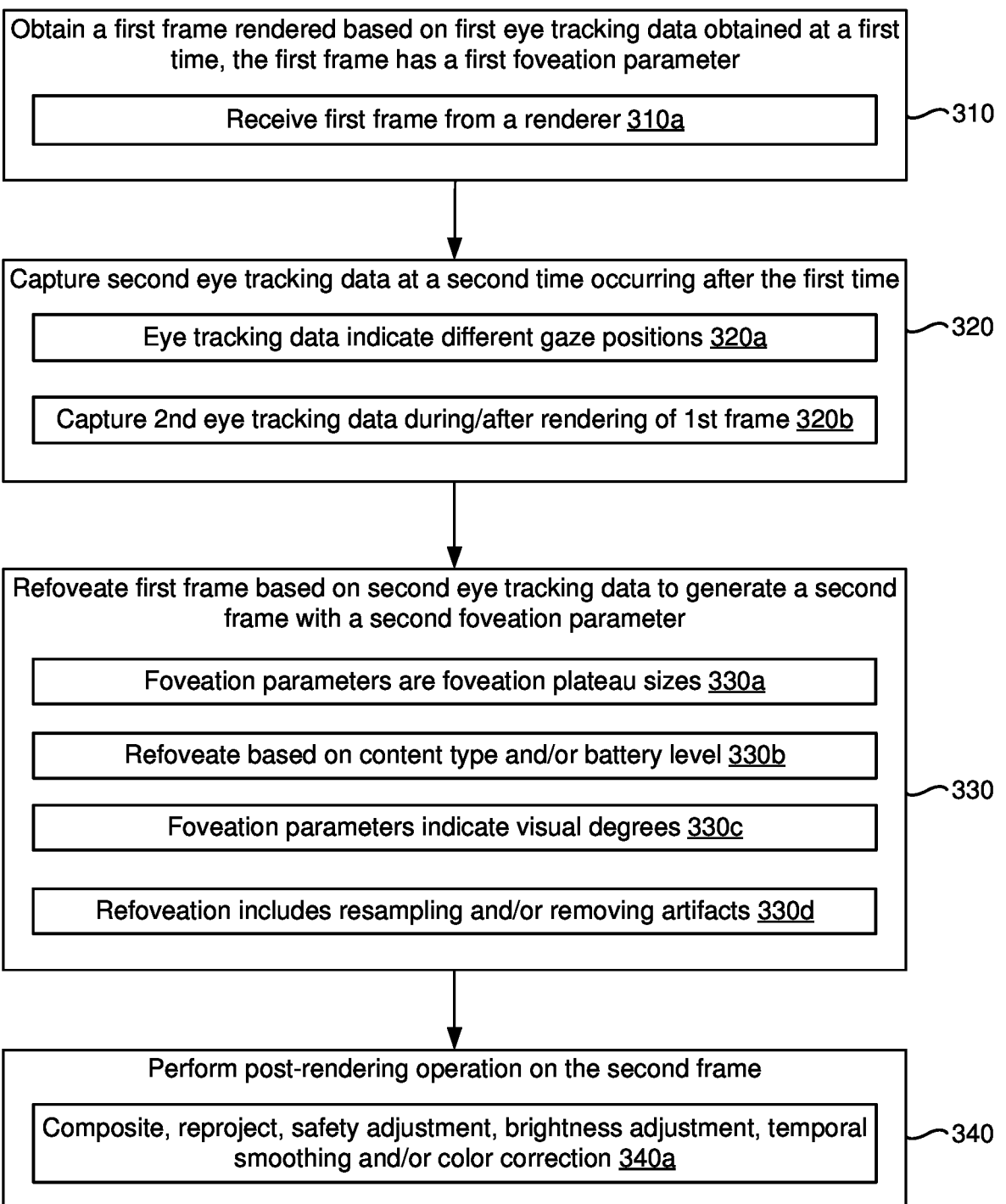

Obtain a first frame rendered based on first eye tracking data obtained at a first time, the first frame has a first foveation parameter Receive first frame from a renderer 310a

310

Capture second eye tracking data at a second time occurring after the first time Eye tracking data indicate different gaze positions 320a Capture 2nd eye tracking data during/after rendering of 1st frame 320b

320

Refoveate first frame based on second eye tracking data to generate a second frame with a second foveation parameter Foveation parameters are foveation plateau sizes 330a Refoveate based on content type and/or battery level 330b Foveation parameters indicate visual degrees 330c Refoveation includes resampling and/or removing artifacts 330d

330

Perform post-rendering operation on the second frame

Composite, reproject, safety adjustment, brightness adjustment, temporal smoothing and/or color correction 340a

REFOVEATION OF RENDERED CONTENT BASED ON GAZE

CROSS-REFERENCE TO RELATED APPLICATIONS

This application claims the benefit of U.S. Provisional Patent App. No. 63/455,595, filed on Mar. 30, 2023, which is incorporated by reference in its entirety.

TECHNICAL FIELD

The present disclosure generally relates to refoveation of rendered content based on gaze.

BACKGROUND

Some devices include a display that displays visual content. Presenting the visual content may include utilizing a renderer to render the visual content. Sometimes the device performs certain operations on the visual content after the renderer has rendered the visual content. Such operations can sometimes be resource-intensive thereby draining a battery of the device.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3 is a flowchart representation of a method of refoveating a frame in accordance with some implementations.

Figure 1A:
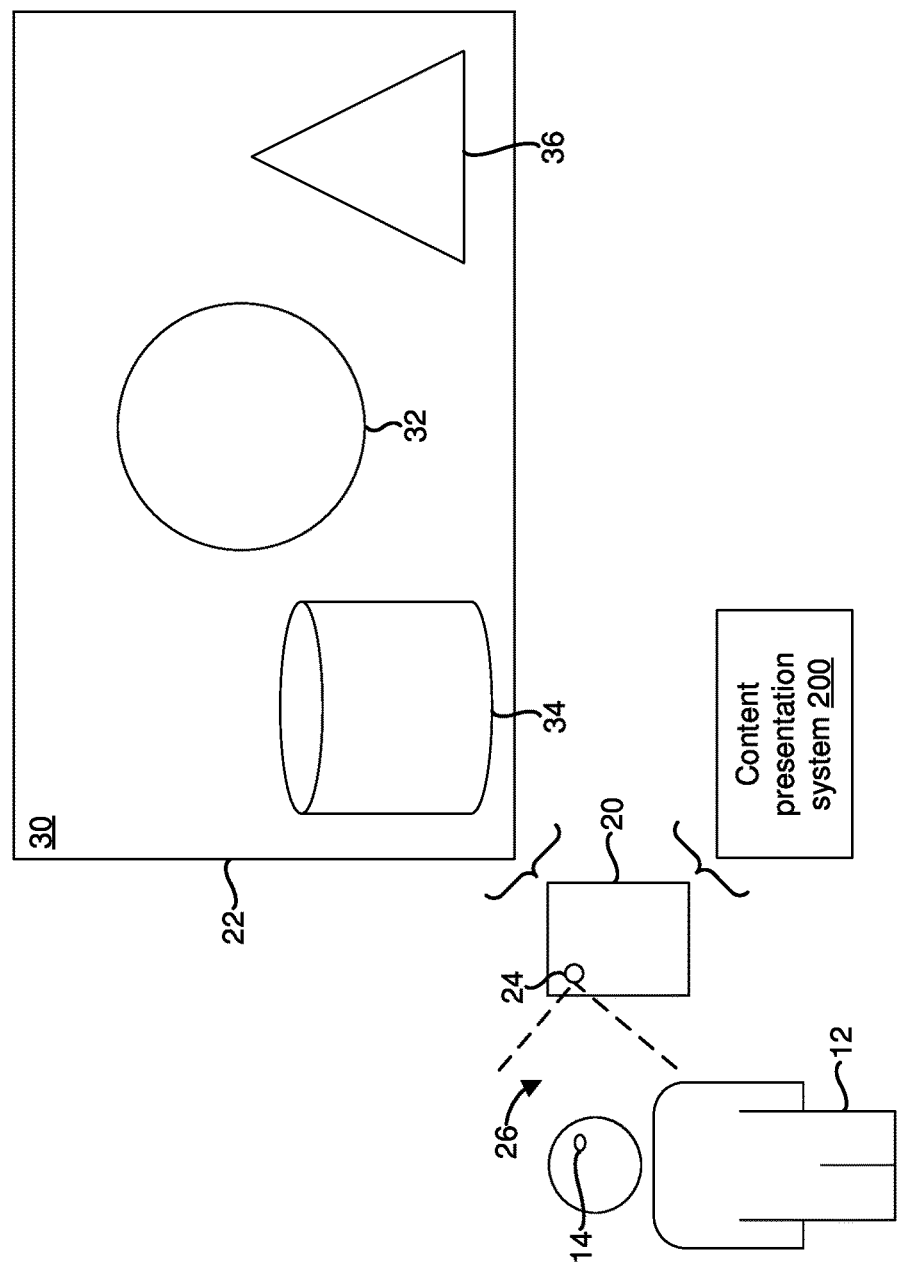
FIG. 1A is a diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for refoveating a frame based on a gaze. In some implementations, a method is performed by a device including a display, an eye tracker, a non-transitory memory and one or more processors coupled with the display, the eye tracker and the non-transitory memory. In various implementations, a method includes obtaining a first frame that is associated with a first foveation parameter. In some implementations, the first frame is rendered based on first eye tracking data obtained at a first time. In various implementations, the method includes capturing, via the eye tracker, second eye tracking data at a second time that occurs after the first time. In various implementations, the method includes refoveating the first frame based on the second eye tracking data in order to generate a second frame with a second foveation parameter that is different from the first foveation parameter. In various implementations, the method includes performing a post-rendering operation on the second frame.

In accordance with some implementations, a device includes one or more processors, a plurality of sensors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A device that displays visual content may include a renderer that generates rendered content and post-rendering operators that perform post-rendering operations on the rendered content in order to generate the visual content that is displayed. The post-rendering operations can be resource-intensive and consume a significant amount of power thereby draining a battery of the device. As such, there is a need to reduce a resource consumption of the post-rendering operators.

The present disclosure provides methods, systems, and/or devices for refoveating rendered content based on gaze. After a renderer has rendered a frame, a device refoveates the frame based on gaze data captured after or during the rendering operation. Refoveating the frame allows the device to selectively reduce a resolution of portions of the frame based on where the user is gazing. Since lower resolution portions of the frame require fewer resources for post-rendering operations, the post-rendering operations become less resource-intensive and consume less power thereby extending a battery life of the device.

The device can perform refoveation by reducing a size of a foveation plateau based on gaze data captured after or during a rendering operation. For example, the device captures first gaze data at a first time, renders a frame based on the first gaze data captured at the first time, captures second gaze data at a second time that occurs after the first time, refoveates the rendered frame based on the second gaze data captured at the second time in order to generate a refoveated frame, and performs post-rendering operations on the refoveated frame instead of the rendered frame in order to reduce resource consumption of the post-rendering operations.

The device can reduce the size of the foveation plateau by a number of visual degrees. For example, the device may reduce the size of the foveation plateau from 10 visual degrees to 8 visual degrees. An amount of reduction in the foveation plateau may be based on a type of content that the frame represents. For example, the device may perform a relatively small reduction in the number of visual degrees for text (e.g., less than 2 visual degrees) and the device may perform a relatively large reduction in the number of visual degrees for video (e.g., 2 visual degrees or more).

The device can refoveate a rendered frame by resampling the rendered frame. For example, the device may refoveate the rendered frame by down sampling the rendered frame or by up sampling the rendered frame. While refoveating the rendered frame, the device may remove artifacts from the rendered frame. For example, the device may remove artifacts caused by performing bilinear interpolation, trilinear interpolation or anisotropic filtering.

After refoveating the rendered frame in order to generate a refoveated frame, the device may perform a set of one or more post-rendering operations on the refoveated frame instead of the rendered frame. For example, the device may utilize a compositor to composite elements onto the refoveated frame. As another example, the device can reproject the refoveated frame. For example, the device may perform head pose reprojection in order to compensate for changes in head pose during or after the rendering operation. The head pose reprojection may provide an appearance that the content is locked (e.g., world-locked, head-locked or body-locked). The device may perform a safety-related operation that may be required by a regulatory authority. The device may change brightness values of respective portions of the refoveated frame. The device may perform temporal smoothing on the refoveated frame. The device may perform color and/or optical correction on the refoveated frame, for example, in order to correct color errors. For example, the device may need to correct a color distortion inadvertently created by the lens on a particular area on the refoveated frame.

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes an electronic device 20 and a user 12 of the electronic device 20. In some implementations, the electronic device 20 includes a handheld computing device that can be held by the user 12. For example, the electronic device 20 may include a smartphone, a tablet, a media player, a laptop or the like that can be held by the user 12. Alternatively, in some implementations, the electronic device 20 includes a wearable computing device that can be worn by the user 12. For example, the electronic device 20 may include a head-mountable device (HMD) or an electronic watch that can be worn by the user 12.

In various implementations, the electronic device 20 includes a display 22 and an image sensor 24 (e.g., a camera) with a field of view 26. The image sensor 24 captures an image of an eye 14 of the user 12 and utilizes the image to generate eye tracking data that tracks the eye 14 of the user 12. The eye tracking data may include a gaze vector that indicates a gaze position, a gaze intensity and a gaze duration of a gaze of the user 12. The display 22 displays visual content 30 that includes various visual elements such as a first visual element 32 represented by a circle, a second visual element 34 represented by a cylinder and a third visual element 36 represented by a triangle. Although the visual elements 32, 34 and 36 are represented by geometric shapes, the visual elements 32, 34 and 36 may include text or a graphic. For example, the visual content 30 may represent textual content (e.g., an ebook, a blog, a message, etc.) or non-textual content (e.g., video content or image content such as a video frame of a video game, a movie or a TV show).

Figure 1B:
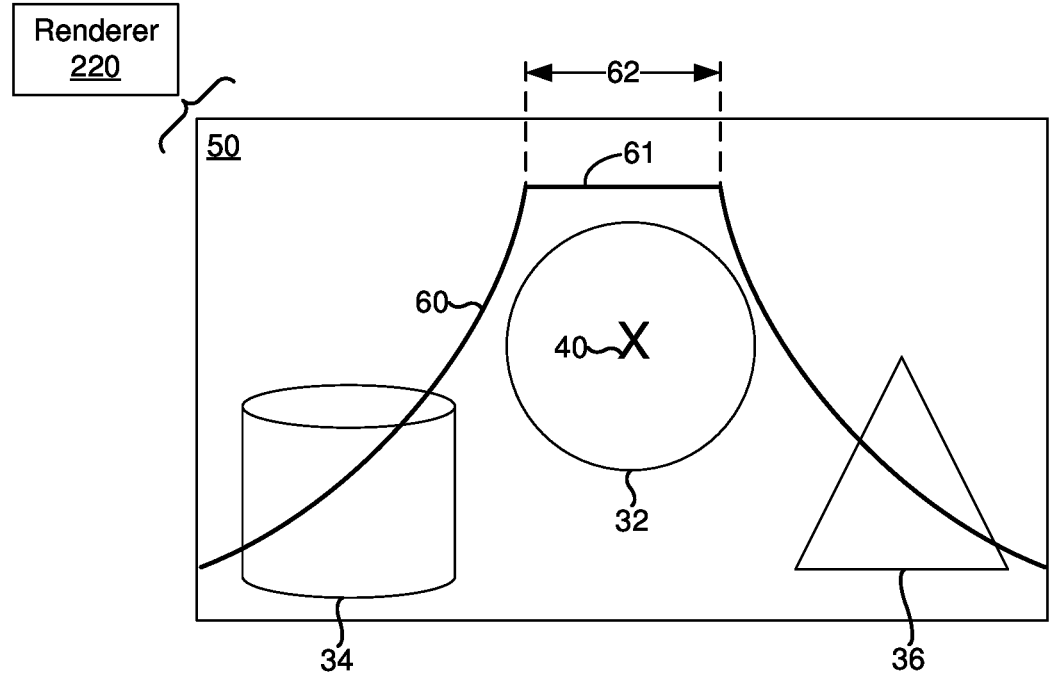
FIG. 1B is a diagram that illustrates a frame generated by a renderer in accordance with some implementations.
Figure 1C:
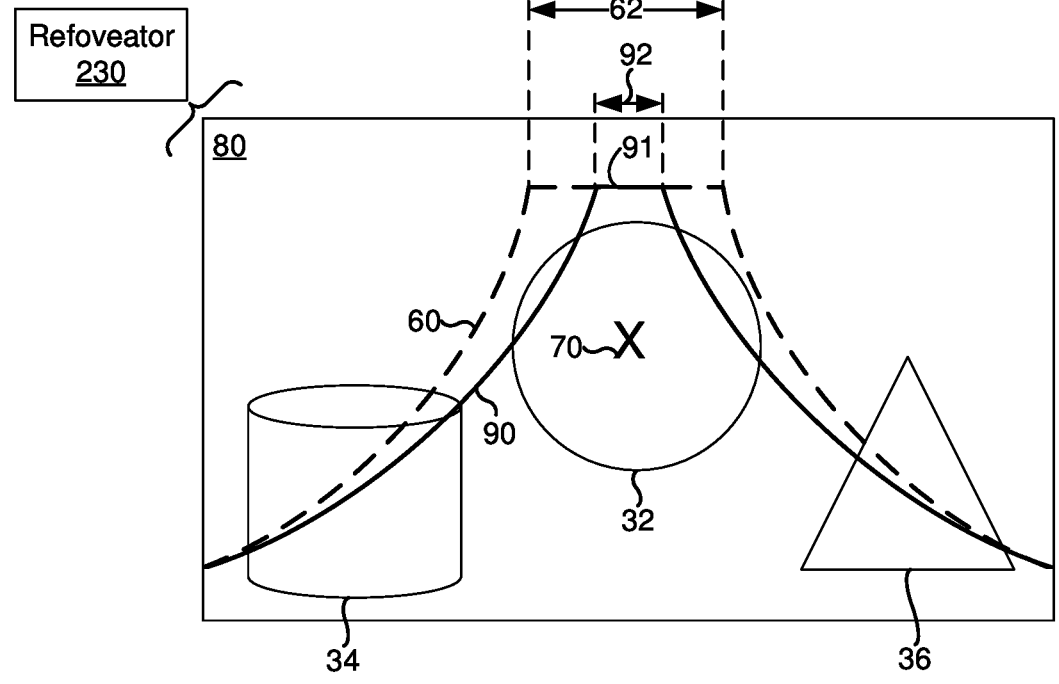
FIG. 1C is a diagram that illustrates a refoveated frame in accordance with some implementations.

In various implementations, the electronic device 20 is associated with (e.g., includes) a content presentation system 200 that renders the visual content 30. The content presentation system 200 renders the visual content 30 based on eye tracking data captured by the image sensor 24. FIGS. 1B and 1C illustrate how the content presentation system 200 generates the visual content 30 that is displayed on the display 22.

Referring to FIG. 1B, the content presentation system 200 (shown in FIG. 1A) includes a renderer 220 that renders a first frame 50 based on a first gaze position 40 indicated by an "X" shown in FIG. 1B. The renderer 220 utilizes a first rendering function 60 to render the first frame 50. In accordance with the first rendering function 60, the renderer 220 renders different portions of the first frame 50 at different resolutions based on respective distances of the portions from the first gaze position 40. For example, the renderer 220 renders a portion of the first frame 50 that the first gaze position 40 is directed to at a relatively high resolution since the user 12 is expected to look at that portion of the first frame 50. In this example, the renderer 220 renders other portions of the first frame 50 that the first gaze position 40 is not directed to at a relatively low resolution since the user 12 is not expected to look at the other portion of the first frame 50.

The first rendering function 60 includes a first foveation plateau 61 that has a first foveation plateau size 62. According to the first rendering function 60, a portion of the first frame 50 that overlaps with the first foveation plateau 61 is rendered at a relatively high resolution and portions of the first frame 50 that do not overlap with the first foveation plateau 61 are rendered at increasingly low resolutions. While the first rendering function 60 and the first foveation plateau 61 are shown in a single dimension, the first rendering function 60 and the first foveation plateau 61 operate on both dimensions of the first frame 50. In some implementations, the renderer 220 selects the first foveation plateau size 62 based on a size of a fovea indicated by eye tracking data captured by the image sensor 24 (shown in FIG. 1A). The renderer 220 may select the first foveation plateau size 62 closer to an upper bound of a range to prevent rendering portions of the first frame 50 that correspond to the fovea at lower resolutions.

Referring to FIG. 1C, in some implementations, the content presentation system 200 (shown in FIG. 1A) includes a refoveator 230 that refoveates the first frame 50 shown in FIG. 1B in order to generate a second frame 80 (e.g., a refoveated frame). The refoveator 230 utilizes a second rendering function 90 that is different from the first rendering function 60 to generate the second frame 80. The second rendering function 90 has a second foveation plateau 91 of a second foveation plateau size 92 that is smaller than the first foveation plateau size 62. Since the second foveation plateau size 92 is smaller than the first foveation plateau size 62, a smaller portion of the second frame 80 is at the highest resolution than the first frame 50 shown in FIG. 1B. A smaller portion of the second frame 80 being at the highest resolution than the first frame 50 also gives the second frame 80 an overall resolution (e.g., an average resolution, for example, a weighted-average resolution) that is less than the first frame 50 shown in FIG. 1B. Since lower resolution frames require fewer resources for post-rendering operations, performing post-rendering operations on the second frame 80 is less resource intensive than performing post-rendering operations on the first frame 50 shown in FIG. 1B.

The refoveator 230 determines the second rendering function 90 based on a second gaze position 70. In particular, the refoveator 230 selects the second foveation plateau size 92 such that a portion of the second frame 80 that overlaps with the second gaze position 70 is at the high resolution. The second gaze position 70 may be slightly different from the first gaze position 40 shown in FIG. 1B because the eye 14 of the user 12 (shown in FIG. 1A) may have shifted between respective times corresponding to the first gaze position 40 and the second gaze position 70. The second gaze position 70 may be based on eye tracking data that is captured after the renderer 220 renders the first frame 50 or while the renderer 220 is rendering the first frame 50.

Figure 2:
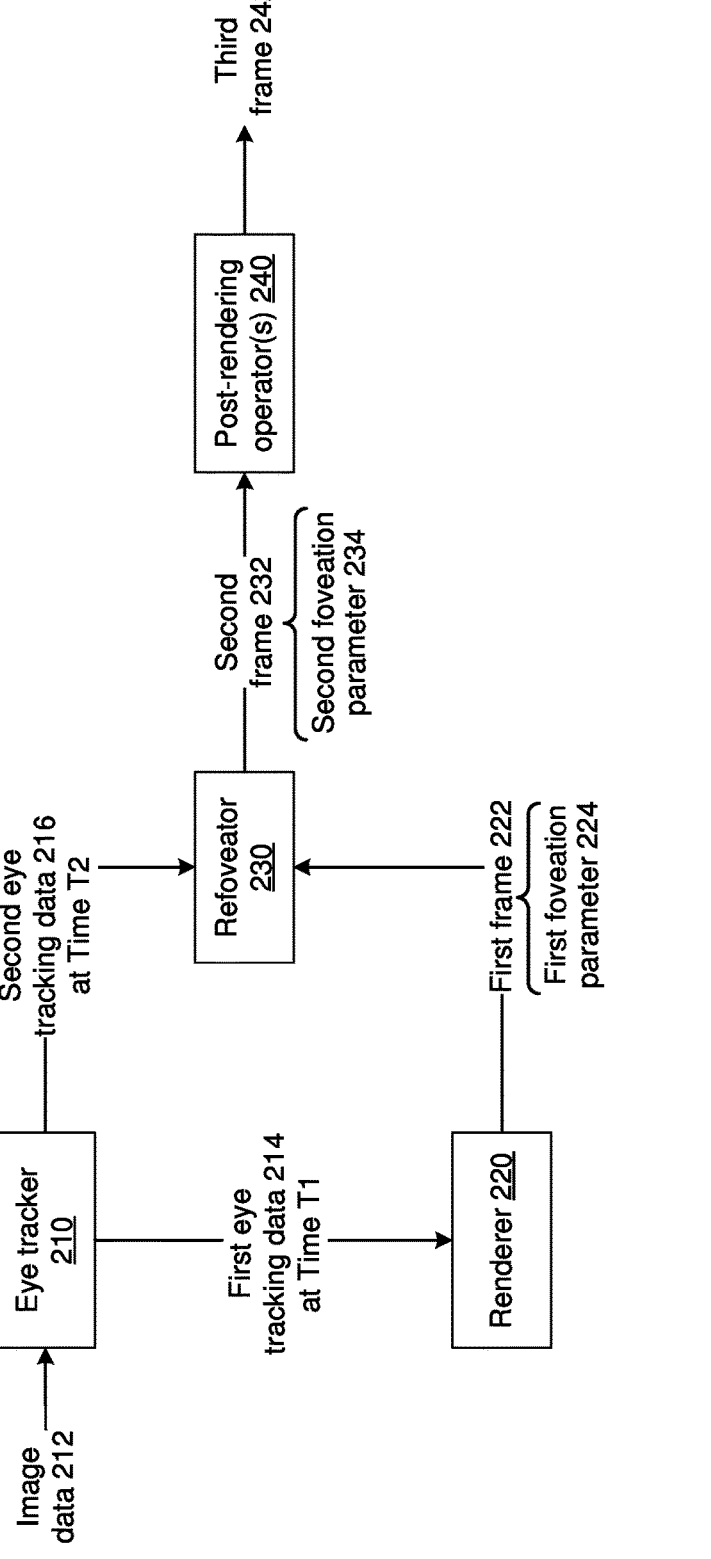
FIG. 2 is a diagram of a content presentation system in accordance with some implementations.

FIG. 2 is a block diagram of the content presentation system 200 in accordance with some implementations. In some implementations, the content presentation system 200 resides at the electronic device 20 shown in FIG. 1A. In various implementations, the content presentation system 200 includes an eye tracker 210, the renderer 220, the refoveator 230, and a set of one or more post-rendering operators 240.

In some implementations, the eye tracker 210 obtains image data 212 from the image sensor 24 shown in FIG. 1A, and tracks a movement of the eye 14 shown in FIG. 1A. The image data 212 may include a set of images captured by the image sensor 24 shown in FIG. 1A. The eye tracker 210 may receive the image data 212 periodically (e.g., at a capture rate corresponding to the image sensor 24 shown in FIG. 1A, for example, at 30 frames per second). At a first time T1, the eye tracker 210 utilizes a first set of images from the image data 212 to generate first eye tracking data 214. The first eye tracking data 214 may include a first gaze vector that indicates the first gaze position 40 (shown in FIG. 1B), a first gaze intensity and/or a first gaze duration of the eye 14 at the first time T1. The eye tracker 210 provides the first eye tracking data 214 to the renderer 220.

The renderer 220 renders the first frame 222 based on the first eye tracking data 214 (e.g., a rendered frame, for example, the first frame 50 shown in FIG. 1B). The first frame 222 is associated with a first foveation parameter 224 (e.g., the first foveation plateau size 62 shown in FIGS. 1B and 1C). In some implementations, the first foveation parameter 224 corresponds to a fovea indicated by the first eye tracking data 214. In some implementations, the renderer 220 generates the first frame 222 by utilizing a first rendering function with a first foveation plateau of a first size. The first foveation plateau encompasses (e.g., overlaps) with an entirety of a portion of the first frame 222 that corresponds to the fovea. In some implementations, the renderer 220 renders the first frame 222 such that a gaze position indicated by the first eye tracking data 214 is at a center of the first foveation plateau. For example, as shown in FIG. 1B, the first gaze position 40 is at a center of the first foveation plateau 61.

In some implementations, the refoveator 230 obtains the first frame 222 from the renderer 220. The refoveator 230 obtains second eye tracking data 216 from the eye tracker 210 at a second time T2 that occurs after the first time T1. The eye tracker 210 utilizes a second set of images from the image data 212 to generate the second eye tracking data 216. The refoveator 230 may obtain the second eye tracking data 216 after the renderer 220 renders the first frame 222 or while the renderer 220 is rendering the first frame 222. The second eye tracking data 216 may include a second gaze vector that indicates the second gaze position 70 shown in FIG. 1C, a second gaze intensity and/or a second gaze duration of the eye 14 of the user 12 shown in FIG. 1A. The refoveator 230 refoveates the first frame 222 based on the second eye tracking data 216 in order to generate a second frame 232 (e.g., a refoveated frame or a refoveated version of the rendered frame).

In some implementations, the second frame 232 is associated with a second rendering function that is different from the first rendering function that the renderer 220 utilized to render the first frame 222 (e.g., the second frame 232 is associated with the second rendering function 90 shown in FIG. 1C). The second frame 232 is associated with a second foveation parameter 234 that is different from the first foveation parameter 224. The second foveation parameter 234 may refer to a second foveation plateau of a second size that is smaller than the first foveation plateau of the first size (e.g., the second foveation plateau size 92 shown in FIG. 1C). While the second foveation plateau associated with the second frame 232 may be smaller than the first foveation plateau associated with the first frame 222, the second foveation plateau encompasses (e.g., overlaps with) the second gaze position indicated by the second eye tracking data 216.

Selecting the second foveation parameter 234 to be smaller than the first foveation parameter 224 causes the second frame 232 to have a resolution that is less than a resolution of the first frame 222. For example, since the second frame 232 utilizes a smaller foveation plateau than the first frame 222, a smaller portion of the second frame 232 utilizes the highest resolution than the first frame 222. Since portions of the second frame 232 are at a lower resolution than corresponding portions of the first frame 222, performing post-rendering operations on the second frame 232 is less resource intensive than performing post-rendering operations on the first frame 222. Utilizing fewer computing resources to perform the post-rendering operations tends to prolong a battery life of the electronic device 20 thereby increasing an operability of the electronic device 20 and allowing the user 12 to continue using the electronic device 20 for a longer time duration.

In some implementations, the refoveator 230 selects the second foveation parameter 234 based on a type of content that the first frame 222 represents. As such, in some implementations, a difference between the first foveation parameter 224 and the second foveation parameter 234 is based on the type of content that the first frame 222 represents. In some implementations, the difference between the first foveation parameter 224 and the second foveation parameter 234 is smaller than a threshold when the first frame 222 represents textual content. For example, a difference in size between the first foveation plateau and the second foveation plateau is less than two visual degrees when the first frame 222 represents textual content. A significant difference between the respective sizes of the first and second foveation plateaus may adversely impact readability of textual content. Hence, limiting the difference between the respective sizes of the first and second foveation plateaus tends to reduce the impact on readability of the textual content. In some implementations, the difference between the first foveation parameter 224 and the second foveation parameter 234 is greater than the threshold when the first frame 222 represents non-textual content such as video content. For example, a difference in size between the first foveation plateau and the second foveation plateau is equal to or greater than two visual degrees when the first frame 222 represents video content. Selecting the second foveation parameter 234 based on the type of content allows the refoveator 230 to reduce resource consumption for post-rendering operations while limiting adverse impact on viewability.

In some implementations, the refoveator 230 selects the second foveation parameter 234 based on a resource availability level (e.g., an amount of resources available to the content presentation system 200 and/or the electronic device 20 shown in FIG. 1A). As such, in some implementations, a difference between the first foveation parameter 224 and the second foveation parameter 234 is based on the resource availability level. An example of the resource availability level includes a battery level of the electronic device 20 shown in FIG. 1A. Another example of the resource availability level includes an amount of bandwidth that is available to the electronic device 20 shown in FIG. 1A. In some implementations, the difference between the first foveation parameter 224 and the second foveation parameter 234 is smaller than a threshold when the resource availability level is greater than a resource threshold. For example, the difference between the first foveation plateau and the second foveation plateau may be less than two visual degrees when the battery level of the device is greater than a threshold battery level (e.g., greater than 80%). In some implementations, the difference between the first foveation parameter 224 and the second foveation parameter 234 is greater than the threshold when the resource availability level is less than the resource threshold. For example, the difference between the first foveation plateau and the second foveation plateau may be two visual degrees or more when the battery level of the device is less than a threshold battery level (e.g., less than 50%). Selecting the second foveation parameter 234 based on the resource availability level allows the refoveator 230 to control resource consumption of post-rendering operations thereby extending a battery life of the device.

In some implementations, the refoveator 230 refoveates the first frame 222 by resampling the first frame 222. For example, the refoveator 230 may perform down sampling or up sampling on the first frame 222 as part of the refoveation operation. In some implementations, the refoveator 230 removes artifacts from the first frame 222 as part of the refoveation operation. As such, while the first frame 222 may include artifacts introduced as a result of interpolation, the second frame 232 may not include the artifacts.

In some implementations, the refoveator 230 refoveates the first frame 222 in response to receiving an indication that one or more post-rendering operations are to be performed on the first frame 222. In some implementations, the refoveator 230 forgoes refoveating the first frame 222 in response to receiving an indication that no post-rendering operations are to be performed on the first frame 222.

After the refoveator 230 refoveates the first frame 222 in order to generate the second frame 232, a set of post-rendering operators 240 perform post-rendering operations on the second frame 232 in order to generate a third frame 242 (e.g., the visual content 30 shown in FIG. 1A). In some implementations, the post-rendering operators 240 include a compositor that composites elements onto the second frame

232 in order to generate the third frame 242 for display. In some implementations, the post-rendering operators 240 include a reprojector that reprojects the second frame 232 from a different point-of-view in order to generate the third frame 242. The reprojection may include reprojecting the second frame 232 based on head pose data obtained after the first frame 222 was rendered or while the first frame 222 was being rendered. The post-rendering operators 240 may include a safety adjustor that adjusts the second frame 232 based on a safety criterion that may have been specified by a regulatory authority. The post-rendering operators 240 may include a brightness adjustor that adjusts brightness values of respective portions of the second frame 232. The post-rendering operators 240 may include a temporal smoother that performs temporal smoothing on the second frame 232. The post-rendering operators 240 may include a color corrector that performs a color correction operation on the second frame 232 in order to compensate for color distortion that a particular area of a lens may have created.

FIG. 3 is a flowchart representation of a method 300 for refoveating a rendered frame in order to generate a refoveated frame for post-rendering operations. In various implementations, the method 300 is performed by the electronic device 20 shown in FIG. 1A and/or the content presentation system 200 shown in FIGS. 1A and 2. In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes obtaining a first frame that is associated with a first foveation parameter. In some implementations, the first foveation parameter refers to a first size of a first foveation plateau associated with a first rendering function that was utilized to generate the first frame. For example, the first foveation parameter includes the first foveation plateau size 62 shown in FIG. 1B. As another example, the first foveation parameter includes the first foveation parameter 224 associated with the first frame 222 generated by the renderer 220. As represented by block 310a, in some implementations, the method 300 includes receiving the first frame from a renderer that generated the first frame. For example, as shown in FIG. 1B, the renderer 220 generates the first frame 50. As another example, as shown in FIG. 2, the refoveator 230 receives the first frame 222 from the renderer 220. In some implementations, the first frame is rendered based on first eye tracking data obtained at a first time. For example, as shown in FIG. 2, the renderer 220 renders the first frame 222 based on the first eye tracking data 214 that the eye tracker 210 generated at the first time T1.

As represented by block 320, in various implementations, the method 300 includes capturing, via the eye tracker, second eye tracking data at a second time that occurs after the first time. For example, as shown in FIG. 2, the eye tracker 210 provides the second eye tracking data 216 at the second time T2 that occurs after the first time T1. As represented by block 320a, in some implementations, the first eye tracking data indicates a first gaze position (e.g., the first gaze position 40 shown in FIG. 1B) and the second eye tracking data indicates a second gaze position (e.g., the second gaze position 70 shown in FIG. 1C) that is different from the first gaze position.

As represented by block 320b, in some implementations, capturing the second eye tracking data includes capturing the second eye tracking data after the first frame is rendered.

For example, referring to FIG. 2, in some implementations, the eye tracker 210 generates the second eye tracking data 216 based on a first portion of the image data 212 that was captured after the renderer 220 rendered the first frame 222. In some implementations, capturing the second eye tracking data includes capturing the second eye tracking data while the first frame is being rendered. For example, referring to FIG. 2, in some implementations, the eye tracker 210 generates the second eye tracking data 216 based on a second portion of the image data 212 that was captured while the renderer 220 was rendering the first frame 222.

As represented by block 330, in various implementations, the method 300 includes refoveating the first frame based on the second eye tracking data in order to generate a second frame with a second foveation parameter that is different from the first foveation parameter. For example, as shown in FIG. 2, the refoveator 230 refoveates the first frame 222 based on the second eye tracking data 216 in order to generate the second frame 232 with the second foveation parameter 234 that is different from the first foveation parameter 224 of the first frame 222. In some implementations, the first foveation parameter indicates a first value and the second foveation parameter indicates a second value that is different from (e.g., smaller than) the first value.

As represented by block 330a, in some implementations, the first foveation parameter indicates a first foveation plateau size and the second foveation parameter indicates a second foveation plateau size that is smaller than the first foveation plateau size. For example, as shown in FIG. 1C, the second foveation plateau size 92 associated with the second frame 80 is smaller than the first foveation plateau size 62 associated with the first frame 50 shown in FIG. 1B. Reducing the foveation plateau size results in a smaller portion of the refoveated frame being at the highest resolution than the rendered frame thereby requiring fewer resources for post-rendering operations.

As represented by block 330b, in some implementations, refoveating the first frame includes selecting the second foveation parameter based on a type of content that the first frame represents. In some implementations, the method 300 includes determining a type of content that the first frame represents. For example, the device determines whether the first frame represents textual content (e.g., text such as an ebook, a blog, etc.) or graphic content (e.g., a video frame of a movie, a video game or a TV show). Significantly reducing a resolution of textual content may adversely impact readability of the textual content. As such, when the first frame represents textual content, the device selects the second foveation parameter such that a difference between the first foveation parameter and the second foveation parameter is less than a threshold. As an example, referring to FIGS. 1B and 1C, when the first frame 50 represents textual content, the refoveator 230 selects the second foveation plateau size 92 such that a difference between the first foveation plateau size 62 and the second foveation plateau size 92 is less than two visual degrees.

In some implementations, a resolution of non-textual content (e.g., video content) can be reduced to a greater degree than the resolution of textual content without a significant adverse impact on viewability of the non-textual content. As such, when the first frame represents non-textual content (e.g., video content), the device selects the second foveation parameter such that a difference between the first foveation parameter and the second foveation parameter is greater than or equal to a threshold. As an example, referring to FIGS. 1B and 1C, when the first frame 50 represents non-textual content (e.g., video content), the refoveator 230 selects the second foveation plateau size 92 such that a difference between the first foveation plateau size 62 and the second foveation plateau size 92 is two visual degrees or more (e.g., four visual degrees).

In some implementations, refoveating the first frame includes selecting the second foveation parameter based on a resource availability of the device. Performing post-rendering operations on higher resolution frames is more resource-intensive than performing post-rendering operations on lower resolution frames. When an amount of available resources is less than a threshold amount, the device can conserve resources by selecting the second foveation parameter such that the second frame has a relatively low resolution that results in fewer resources being utilized for post-rendering operations. As such, when the amount of available resources is less than the threshold amount, the device may select the second foveation parameter such that a difference between the second foveation parameter and the first foveation parameter is greater than a threshold difference. For example, the device may decrease a size of the foveation plateau by more than two visual degrees (e.g., by four visual degrees). By contrast, when the amount of available resources is greater than the threshold amount, the device need not conserve resources to a great degree and the device may select the second foveation parameter such that the difference between the second foveation parameter and the first foveation parameter is less than the threshold difference. For example, the device may decrease the size of the foveation plateau by less than two visual degrees. In some implementations, a value of the second foveation parameter is directly proportional to the amount of available resources (e.g., lower levels of resource availability result in smaller values for the second foveation parameter).

In some implementations, refoveating the first frame includes selecting the second foveation parameter based on a battery level of the device. Performing post-rendering operations on higher resolution frames is more power-intensive than performing post-rendering operations on lower resolution frames. As such, when the battery level of the device is less than a threshold battery level, the device can conserve battery power by selecting the second foveation parameter such that the second frame has a relatively low resolution that results in fewer resources being utilized for post-rendering operations. Hence, when the battery level is less than the threshold battery level, the device selects the second foveation parameter such that a difference between the second foveation parameter and the first foveation parameter is greater than a threshold difference. For example, the device decreases a size of the foveation plateau by more than two visual degrees (e.g., by four visual degrees). By contrast, when the battery level is greater than the threshold battery level, the device need not conserve power to a great degree and the device may select the second foveation parameter such that the difference between the second foveation parameter and the first foveation parameter is less than the threshold difference. For example, the device may decrease the size of the foveation plateau by less than two visual degrees when the battery level is greater than the threshold battery level. In some implementations, a value of the second foveation parameter is directly proportional to the battery level of the device (e.g., lower battery levels result in smaller values for the second foveation parameter).

As represented by block 330c, in some implementations, the first foveation parameter corresponds to a first number of visual degrees and the second foveation parameter corresponds to a second number of visual degrees that is smaller than the first number of visual degrees. For example, referring to FIGS. 1B and 1C, the first foveation plateau size 62 may include a first value that represents a first number of visual degrees, and the second foveation plateau size 92 may include a second value that is smaller than the first value and represents a second number of visual degrees that is smaller than the first number of visual degrees. As an example, the second foveation parameter may be less than the first foveation parameter by two visual degrees.

As represented by block 330d, in some implementations, refoveating the first frame includes resampling the first frame. For example, referring to FIG. 2, the refoveator 230 may down sample portions of the first frame 222 or up sample portions of the first frame 222 when the refoveator 230 is refoveating the first frame 222 to generate the second frame 232. In some implementations, refoveating the first frame includes removing artifacts from the first frame. For example, referring to FIGS. 1B and 1C, the first frame 50 may include artifacts that may have been introduced into the first frame 50 as a result of an interpolation operation, and the refoveator 230 may remove the artifacts from the first frame 50 so that the second frame 80 does not include the artifacts.

As represented by block 340, in various implementations, the method 300 includes performing a post-rendering operation on the second frame. For example, as shown in FIG. 2, the post-rendering operator(s) 240 perform one or more post-rendering operations on the second frame 232 in order to generate the third frame 242 that is displayed on a display. As another example, as discussed in relation to FIGS. 1A-1C, the content presentation system 200 performs one or more post-rendering operations on the second frame 80 shown in FIG. 1C in order to generate the visual content 30 shown in FIG. 1A. Performing the post-rendering operation(s) on the second frame instead of the first frame is less resource-intensive because portions of the second frame are at a lower resolution than the first frame. As such, performing post-rendering operations on second frame instead of performing post-rendering operations on the first frame tends to conserve power and extend a battery life of the device. More generally, performing post-rendering operations on the second frame instead of performing post-rendering operations on the first frame satisfies a resource utilization threshold because performing the post-rendering operations on the second frame utilizes fewer resources than performing the post-rendering operations on the first frame.

As represented by block 340a, in some implementations, performing the post-rendering operation includes utilizing a compositor to composite elements onto the second frame. For example, referring to FIG. 2, in some implementations, one of the post-rendering operators 240 includes a compositor that composites elements onto the second frame 232 in order to generate the third frame 242. Compositing elements onto the second frame 232 requires less power than compositing elements on the first frame 222 because the second frame 232 has a lower resolution than the first frame 222.

In some implementations, performing the post-rendering operation includes reprojecting the second frame based on head pose data obtained after the first frame was rendered. For example, referring to FIG. 2, in some implementations, one of the post-rendering operators 240 includes a reprojector that reprojects the second frame 232 based on head pose data that the content presentation system 200 acquired after the renderer 220 rendered the first frame 222. Since portions of the second frame 232 are at a lower resolution than corresponding portions of the first frame 222, reprojecting the second frame 232 is less resource-intensive (e.g., requires fewer computing resources and/or requires less time) than reprojecting the first frame 222. An amount of resources required to perform a reprojection operation may be a function of a number of pixels that are to be reprojected. Reprojecting the second frame 232 may require fewer computing resources than reprojecting the first frame 222, for example, because the second frame 232 has fewer pixels than the first frame 222.

In some implementations, performing the post-rendering operation includes adjusting the second frame based on a safety criterion specified by a regulatory entity. For example, referring to FIG. 2, in some implementations, one of the post-rendering operators 240 includes a safety adjustor that performs safety-related adjustments, for example, in order to increase a safety of a user of the device. An example of a safety-related adjustment may be to limit display of information while the device is moving. Another example of a safety-related adjustment may be to modify pixels to prevent aggravating a health condition (e.g., preventing a seizure caused by flashing lights). Performing safety-related adjustments on the second frame 232 utilizes fewer computing resources than performing the safety-related adjustments on the first frame 222 because an overall resolution of the second frame 232 is lower than an overall resolution of the first frame 222.

In some implementations, performing the post-rendering operation includes changing brightness values of respective portions of the second frame. For example, referring to FIG. 2, in some implementations, one of the post-rendering operators 240 includes a brightness adjustor that adjusts respective brightness values of pixels in the second frame 232. As an example, the brightness adjustor may adjust the brightness values based on an ambient lighting level of a physical environment surrounding the device. Adjusting the brightness values associated with the second frame 232 may be less resource-intensive than adjusting the brightness values of the first frame 222, for example, because the second frame 232 includes fewer pixels than the first frame 222.

In some implementations, performing the post-rendering operation includes performing a temporal smoothing operation on the second frame. For example, referring to FIG. 2, in some implementations, one of the post-rendering operators 240 includes a temporal smoother that performs temporal smoothing on the second frame 232. Performing temporal smoothing on the second frame 232 may be require fewer computing resources that performing temporal smoothing on the first frame 222 due to the reduced resolution of the second frame 232 in comparison to the first frame 222.

In some implementations, performing the post-rendering operation includes performing a color correction operation on the second frame in order to compensate for color distortion introduced by a lens of the device. In some implementations, the first frame 222 corresponds to an image captured by a camera of the device and, in capturing the image, a lens or a portion of the lens may have introduced a distortion in the first frame 222. Referring to FIG. 2, in some implementations, one of the post-rendering operators 240 includes a color corrector that performs the color correction operation on the second frame 232. The color correction may be performed on a pixel-by-pixel basis. As such, performing the color correction on the second frame 232 may require fewer resources than performing the color correction on the first frame 222 due to the second frame 232 having a fewer number of pixels than the first frame 222.

In various implementations, the post-rendering operations are performed on a pixel-by-pixel basis. Performing the post-rendering operations on the second frame is less resource-intensive than performing the post-rendering operations on the first frame, for example, because the second frame has fewer pixels than the first frame. Since the second frame has fewer pixels than the first frame as a result of the refoveation, fewer pixel-by-pixel operations need to be performed on the second frame thereby conserving resources.

Figure 4:
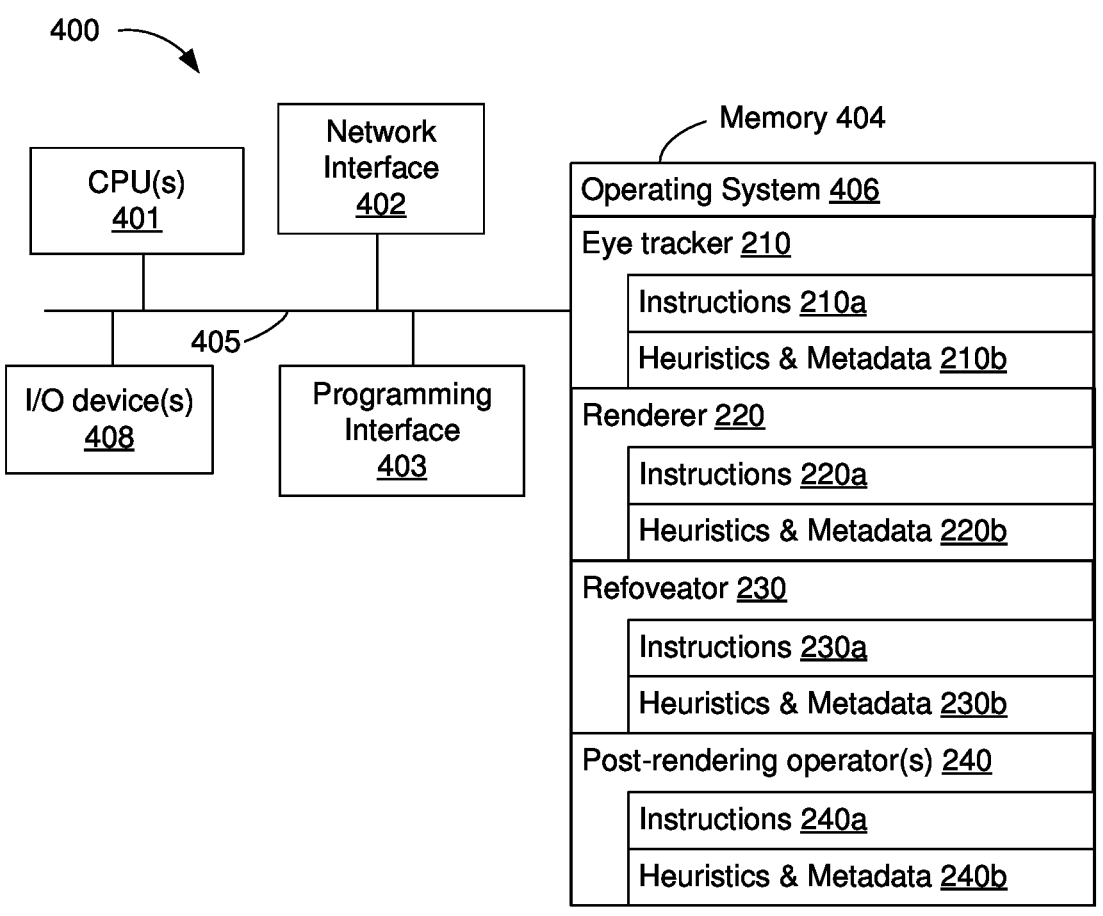
FIG. 4 is a block diagram of a device that refoveates a frame in accordance with some implementations.

FIG. 4 is a block diagram of a device 400 in accordance with some implementations. In some implementations, the device 400 implements the electronic device 20 shown in FIG. 1A and/or the content presentation system 200 shown in FIGS. 1A and 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 408, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the one or more I/O devices 408 include a display (e.g., the display 22 shown in FIG. 1A). In some implementations, the display includes an extended reality (XR) display. In some implementations, the display includes an opaque display. Alternatively, in some implementations, the display includes an optical see-through display. In some implementations, the one or more I/O devices 408 include an image sensor (e.g., the image sensor 24 shown in FIG. 1A).

In some implementations, the memory 404 or the non-transitory computer readable storage medium of the memory 404 stores the following programs, modules and data structures, or a subset thereof including an optional operating system 406, the eye tracker 210, the renderer 220, the refoveator 230 and the post-rendering operator(s) 240.

In various implementations, the eye tracker 210 includes instructions 210a, and heuristics and metadata 210b for capturing eye tracking data that indicates a gaze position, a gaze intensity and/or a gaze duration of a user of the device 400 (e.g., the first gaze position 40 shown in FIG. 1B, the second gaze position 70 shown in FIG. 1C, and/or the first eye tracking data 214 and/or the second eye tracking data 216 shown in FIG. 2).

In some implementations, the renderer 220 includes instructions 220a, and heuristics and metadata 220b for rendering a first frame with a first foveation parameter based on the first eye tracking data captured by the eye tracker 210 (e.g., the first frame 50 shown in FIG. 1B and/or the first frame 222 shown in FIG. 2).

In some implementations, the refoveator 230 includes instructions 230a, and heuristics and metadata 230b for refoveating the first frame based on second eye tracking data in order to generate a second frame with a second foveation parameter that is different from the first foveation parameter (e.g., the second frame 80 shown in FIG. 1C and/or the second frame 232 shown in FIG. 2).

In some implementations, the post-rendering operator(s) 240 include instructions 240a, and heuristics and metadata 240b for performing post-rendering operations on the second frame (e.g., performing a compositing operation, a reprojection operation, a safety-related adjustment, a brightness adjustment, a temporal smoothing operation and/or a color correction operation on the second frame 80 shown in FIG. 1C and/or on the second frame 232 shown in FIG. 2).

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:

at a device including a display, an eye tracker, a non-transitory memory and one or more processors coupled with the display, the eye tracker and the non-transitory memory:

obtaining a first frame that is associated with a first foveation parameter, wherein the first frame is rendered based on first eye tracking data obtained at a first time;

capturing, via the eye tracker, second eye tracking data at a second time that occurs after the first time;

refoveating the first frame based on the second eye tracking data in order to generate a second frame with a second foveation parameter that is different from the first foveation parameter, wherein the first foveation parameter indicates a first foveation plateau size and the second foveation parameter indicates a second foveation plateau size that is smaller than the first foveation plateau size; and performing a post-rendering operation on the second frame.

2. The method of claim 1, wherein the first eye tracking data indicates a first gaze position and the second eye tracking data indicates a second gaze position that is different from the first gaze position.

3. The method of claim 1, wherein capturing the second eye tracking data comprises capturing the second eye tracking data after the first frame is rendered.

4. The method of claim 1, wherein capturing the second eye tracking data comprises capturing the second eye tracking data while the first frame is being rendered.

5. The method of claim 1, wherein refoveating the first frame comprises selecting the second foveation parameter based on a type of content that the first frame represents.

6. The method of claim 1, wherein refoveating the first frame comprises selecting the second foveation parameter based on a battery level of the device.

7. The method of claim 1, wherein the first foveation plateau size corresponds to a first number of visual degrees and the second foveation plateau size corresponds to a second number of visual degrees that is smaller than the first number of visual degrees.

8. The method of claim 1, wherein refoveating the first frame comprises resampling the first frame.

9. The method of claim 1, wherein refoveating the first frame comprises removing artifacts from the first frame.

10. The method of claim 1, wherein performing the post-rendering operation comprises utilizing a compositor to composite elements onto the second frame.

11. The method of claim 1, wherein performing the post-rendering operation comprises reprojecting the second frame based on head pose data obtained after the first frame was rendered.

12. The method of claim 1, wherein performing the post-rendering operation comprises adjusting the second frame based on a safety criterion specified by a regulatory entity.

13. The method of claim 1, wherein performing the post-rendering operation comprises changing brightness values of respective portions of the second frame.

14. The method of claim 1, wherein performing the post-rendering operation comprises performing a temporal smoothing operation on the second frame.

15. The method of claim 1, wherein performing the post-rendering operation comprises performing a color correction operation on the second frame in order to compensate for color distortion introduced by a lens of the device.

16. The method of claim 1, wherein obtaining the first frame comprises receiving the first frame from a renderer.

17. A device comprising:
a display;
an eye tracker;
one or more processors;
a non-transitory memory; and
one or more programs stored in the non-transitory memory, which, when executed by the one or more processors, cause the device to:
obtain a first frame that is associated with a first foveation parameter, wherein the first frame is rendered based on first eye tracking data obtained at a first time;
capture, via the eye tracker, second eye tracking data at a second time that occurs after the first time;
refoveate the first frame based on the second eye tracking data in order to generate a second frame with a second foveation parameter that is different from the first foveation parameter, wherein the first foveation parameter corresponds to a first number of visual degrees and the second foveation parameter corresponds to a second number of visual degrees that is smaller than the first number of visual degrees; and
perform a post-rendering operation on the second frame.

18. The device of claim 17, wherein the first foveation parameter indicates a first foveation plateau size corresponding to the first number of visual degrees and the second foveation parameter indicates a second foveation plateau size corresponding to the second number of visual degrees.

19. A non-transitory memory storing one or more programs, which, when executed by one or more processors of a device with an eye tracker and a display, cause the device to:
obtain a first frame that is associated with a first foveation parameter, wherein the first frame is rendered based on first eye tracking data obtained at a first time;
capture, via the eye tracker, second eye tracking data at a second time that occurs after the first time;
refoveate the first frame based on the second eye tracking data in order to generate a second frame with a second foveation parameter that is different from the first foveation parameter, wherein the first foveation parameter indicates a first foveation plateau size and the second foveation parameter indicates a second foveation plateau size that is smaller than the first foveation plateau size; and
perform a post-rendering operation on the second frame.

20. The non-transitory memory of claim 19, wherein the first foveation plateau size corresponds to a first number of visual degrees and the second foveation plateau size corresponds to a second number of visual degrees that is smaller than the first number of visual degrees.

* * * * *